Sept. 8, 1953  A. W. TONDREAU  2,651,245
MEANS FOR RAPIDLY PROCESSING PHOTOGRAPHIC FILM
Filed Oct. 6, 1949  6 Sheets-Sheet 2
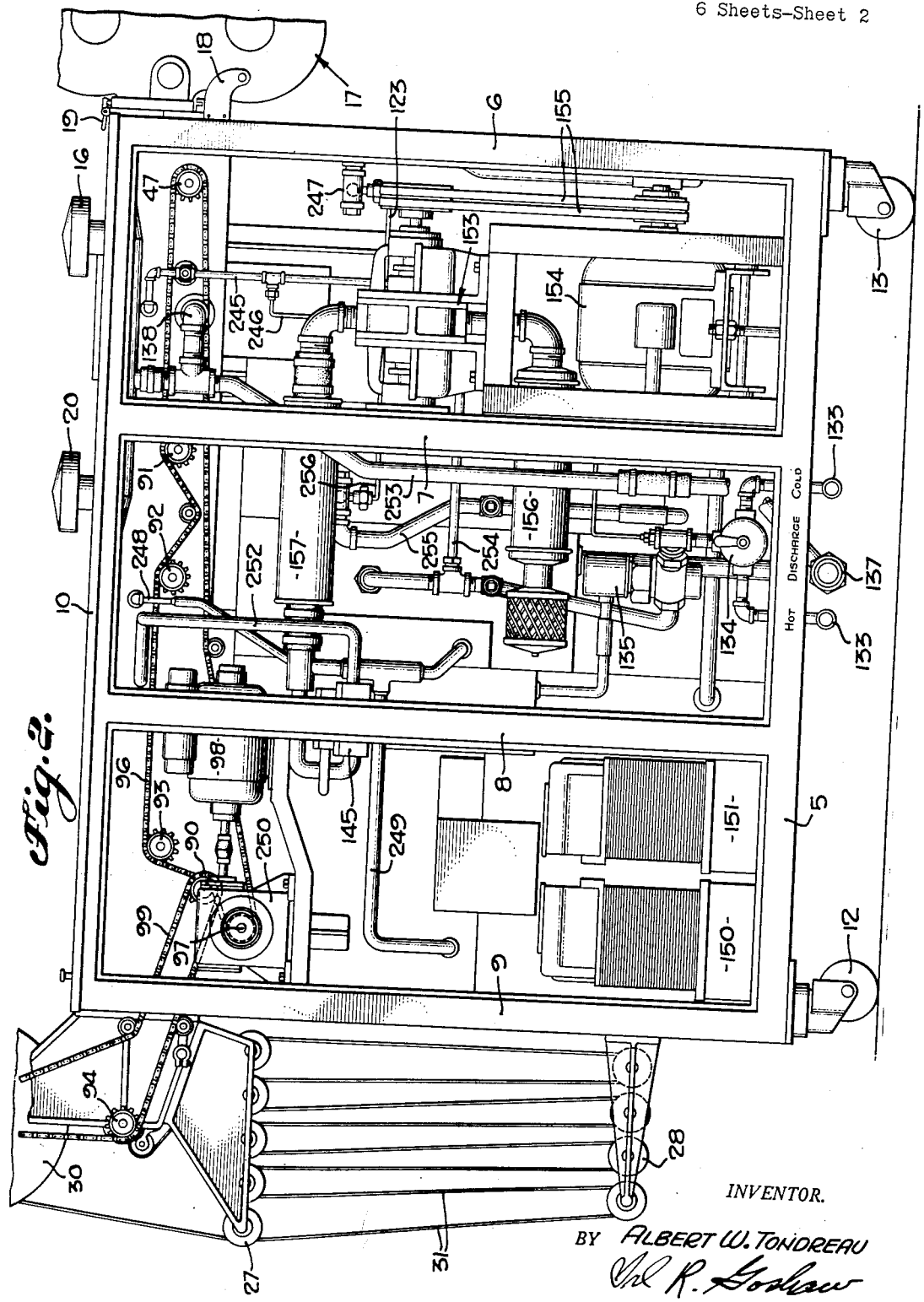
INVENTOR.
BY ALBERT W. TONDREAU
ATTORNEY

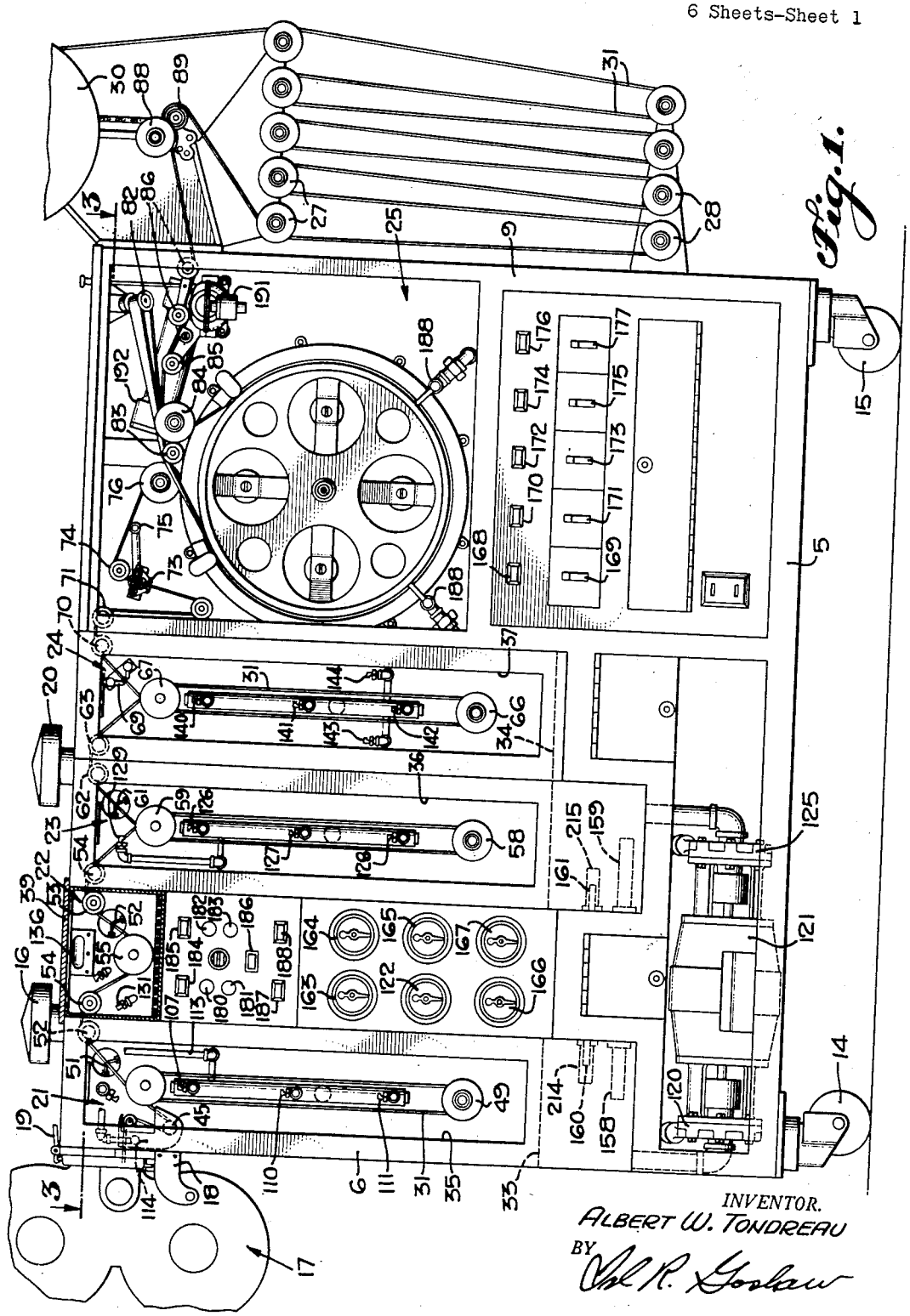

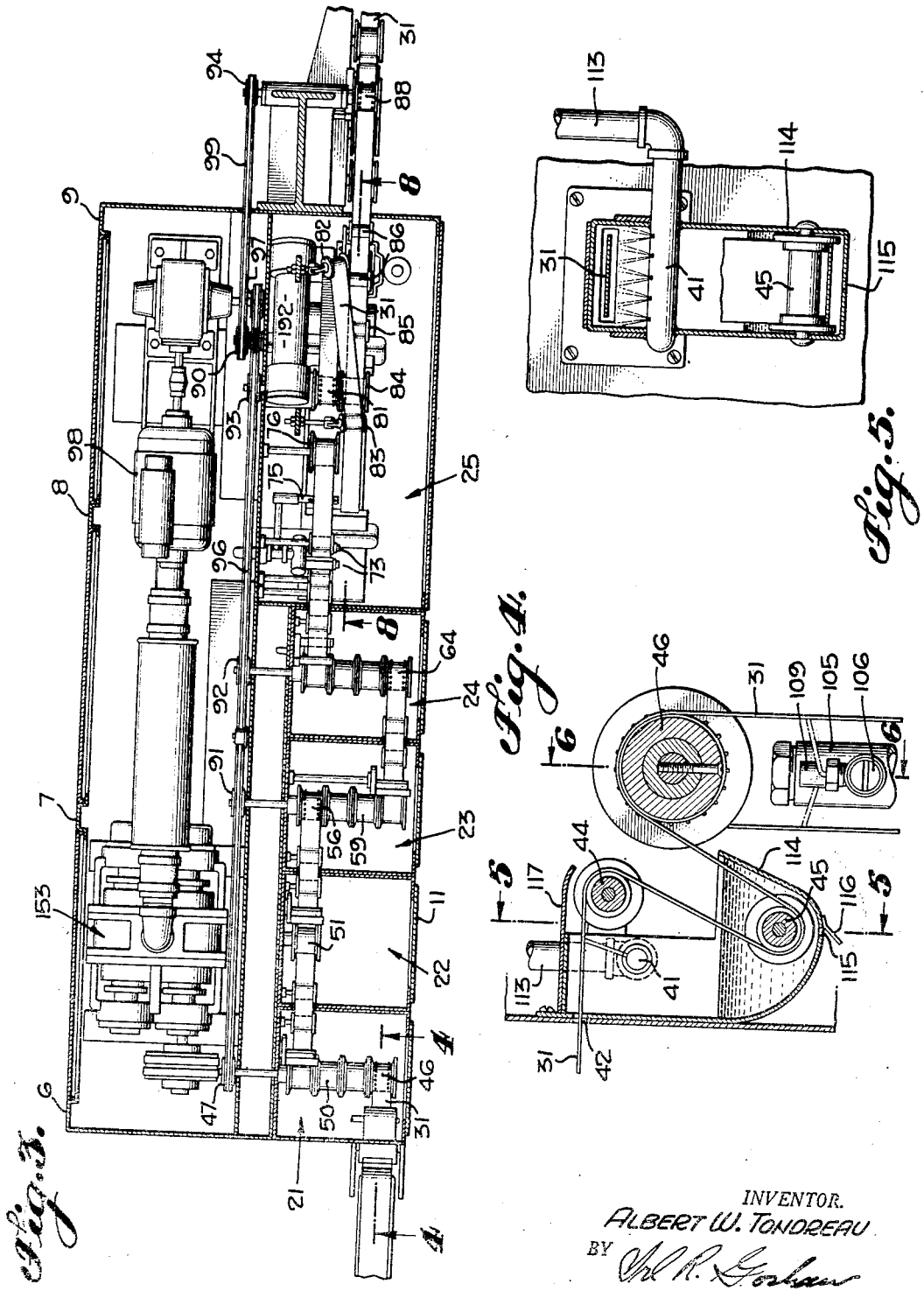

Sept. 8, 1953 A. W. TONDREAU 2,651,245
MEANS FOR RAPIDLY PROCESSING PHOTOGRAPHIC FILM
Filed Oct. 6, 1949 6 Sheets-Sheet 4

INVENTOR.
ALBERT W. TONDREAU
BY
ATTORNEY

Sept. 8, 1953 A. W. TONDREAU 2,651,245
MEANS FOR RAPIDLY PROCESSING PHOTOGRAPHIC FILM
Filed Oct. 6, 1949 6 Sheets-Sheet 5

INVENTOR.
ALBERT W. TONDREAU
BY
ATTORNEY

Sept. 8, 1953

A. W. TONDREAU 2,651,245

MEANS FOR RAPIDLY PROCESSING PHOTOGRAPHIC FILM

Filed Oct. 6, 1949

INVENTOR.
ALBERT W. TONDREAU
BY
ATTORNEY

Patented Sept. 8, 1953

2,651,245

UNITED STATES PATENT OFFICE 2,651,245

MEANS FOR RAPIDLY PROCESSING
PHOTOGRAPHIC FILM

Albert W. Tondreau, Los Angeles, Calif., assignor
to Warner Bros. Pictures, Inc., Burbank, Calif.,
a corporation of Delaware Application October 6, 1949, Serial No. 119,824

1 Claim. (Cl. 95—89)

This invention relates to film developing equipment, and particularly to a self-contained rapid film processing machine, whereby either a negative or positive emulsion has the latent images therein subjected to optimum conditions of development, both from the temperature and from the developer, fixer, and water application standpoints, to provide not only a very short over-all time processing period, but also, particularly high quality images.

There are many film developing machines of various types known in the art, many of which utilize spraying the processing fluids to the emulsion and the removal thereof by gravity or other methods, while maintaining the fluids at certain temperatures. Several types of rapid film drying processes are known, all of which contribute to decrease the over-all development time period. The present invention is directed to a unitary compact device which contains all the elements required to develop the film in a short time period, except for the wash water, which is obtained simply by connecting the machine to normal house hot and cold water supplies. The machine can process film at the rate of ninety feet per minute, so that it can be connected directly to a standard film projector and/or camera, if desired. The film is developed in approximately forty-two seconds.

Safety factors have been built into the unit, whereby a camera magazine can be rapidly attached to the machine; the developer is applied in a manner to avoid fumes and spray streaks; interlocking switch controls insure the proper sequential operation of the various motors for the pumps, compressors, and film drive; automatic devices control the temperature of the fluids used in developing; a special type of rapid dryer is employed to permit a longer length of film to be subjected to the drying action in the minimum of space; and a cooler reduces the temperature of the film to a value where it may be safely wound on a takeup reel. All these features have been incorporated in a compact device, which permits the development of a very large amount of film in a small space, thus avoiding the large present-day developing, washing, and "hypo" tanks.

The principal object of the invention, therefore, is to facilitate the development of motion picture film.

Another object of the invention is to provide a compact and unitary, portable film developing machine, which provides an improved image in a shorter time period than that previously required.

A further object of the invention is to provide an improved method of and means for rapidly developing film and to obtain high quality images thereon.

A still further object of the invention is to provide an improved rapid film developing machine, which has the temperature of the developing fluids automatically controlled and provides a novel form of application of the developer fluid.

A still further object of the invention is to provide an improved rapid film developing machine, which can develop film at a rapid rate of speed, which has a novel form of film drive, and which requires a small amount of floor space.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is an elevational, front view of a developing machine embodying the invention with the doors to the different compartments removed.

Fig. 2 is an elevational, rear view of the machine shown in Fig. 1.

Fig. 3 is a plan view of the machine of the invention taken along the line 3—3 of Fig. 1.

Fig. 4 is a detailed, cross-sectional view of the entrance of the film to the developer tank taken along the line 4—4 of Fig. 3.

Fig. 5 is a detailed, cross-sectional view showing the application of the developer to the film as it enters the developer tank and taken along the line 5—5 of Fig. 4.

Figures 6, 7:
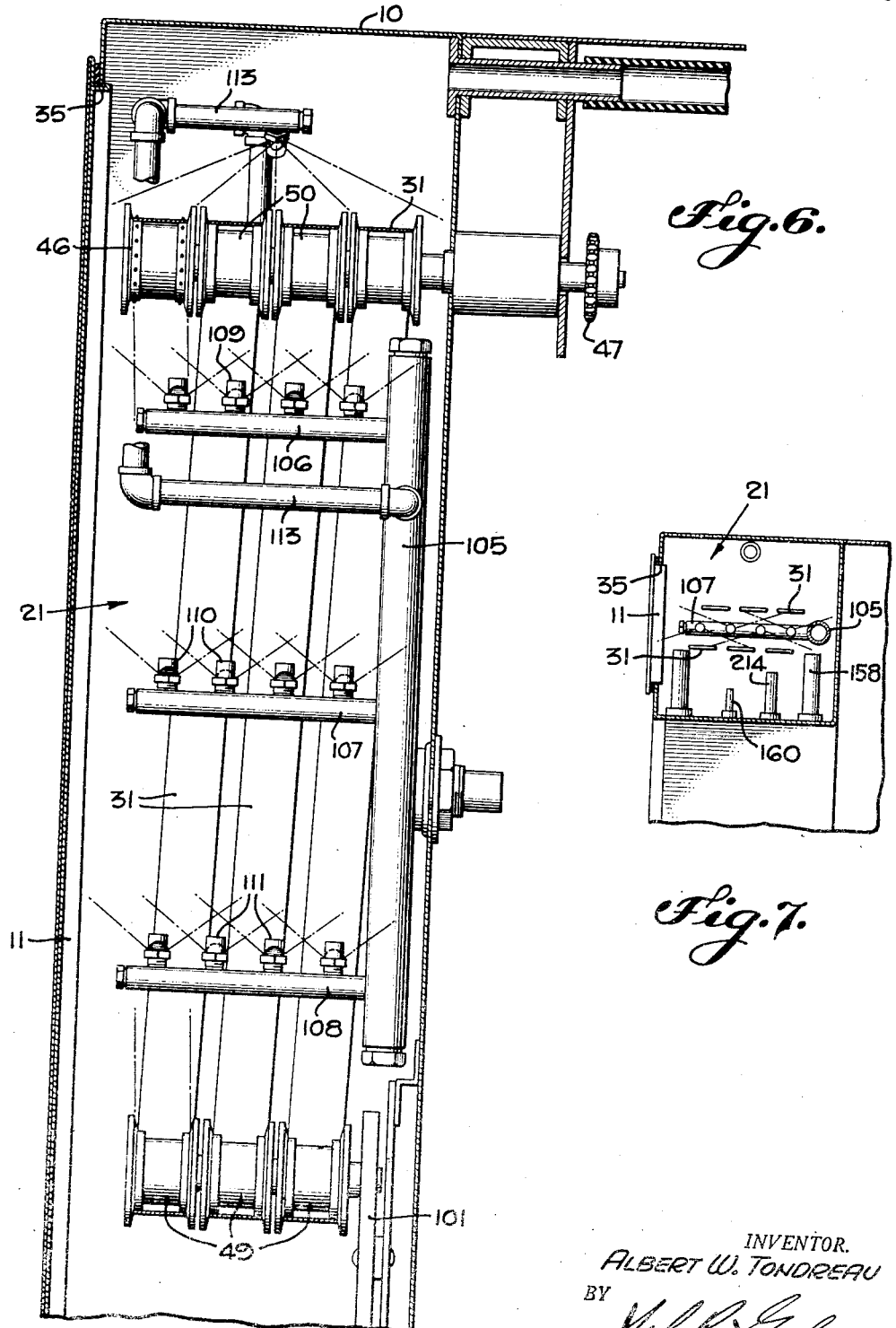
Fig. 6 is an elevational view showing the film passage through the developer tank of the invention and taken along the line 6—6 of Fig. 4.
Fig. 7 is a cross-sectional, plan view showing the developing fluid nozzles and the heater and temperature controls for the fluids.

Referring now to the drawings, in which the same numerals identify like elements, the machine has a frame with bottom members 5 and appropriate upright members 6, 7, 8, and 9 with a cover member 10. The device is rectangular in shape, both horizontally and vertically, and is provided with caster wheels 12, 13, 14, and 15, so that the machine may be easily moved from place to place. As shown in Fig. 1, the standard type of film magazine 17 is pivoted on a bracket 18 and held in place by a latch 19, the film in the magazine being spliced to a leader already in the machine. Thus, the machine is capable of being loaded in the daytime, since the developing and washing tanks are light-proof.

The machine has a plurality of compartments, such as a film developer compartment or tank 21, a quick wash compartment or tank 22, a fixing hypo compartment or tank 23, a wash compartment or tank 24, and a drying compartment 25. After the film 31 passes through these compartments, it passes in loops around a series of rollers 27 and 28, where it is exposed to the air and cooled before being wound on a takeup reel 30. The film 31 is shown passing through the various compartments to the takeup reel 30 in Figs. 1 and 3, and its manner of traveling within tanks 21, 23, and 24 is shown in Fig. 6.

The developer tank 21 is filled with approximately two and one-half gallons of developer, to a level as indicated by the dotted line 33, while approximately two and one-half gallons of fixing hypo are similarly provided in the compartment 23 to the level shown by the dotted line 34. The wash water in compartment 24 passes directly out of the bottom of the tank to the sewer. The developer tank is shown as having an opening 35 thereto, the hypo tank is shown as having an opening 36 thereto, and the wash tank as having an opening 37 thereto, all of which are closed by appropriate liquid and light-tight doors, as shown at 11 in Fig. 7. Exits for the fumes and gases from the developer and hypo tanks 21 and 23 are shown at 16 and 20, respectively. The quick rinse tank 22 has an opening at the top of the machine closed by a cover 39.

Figure 8:
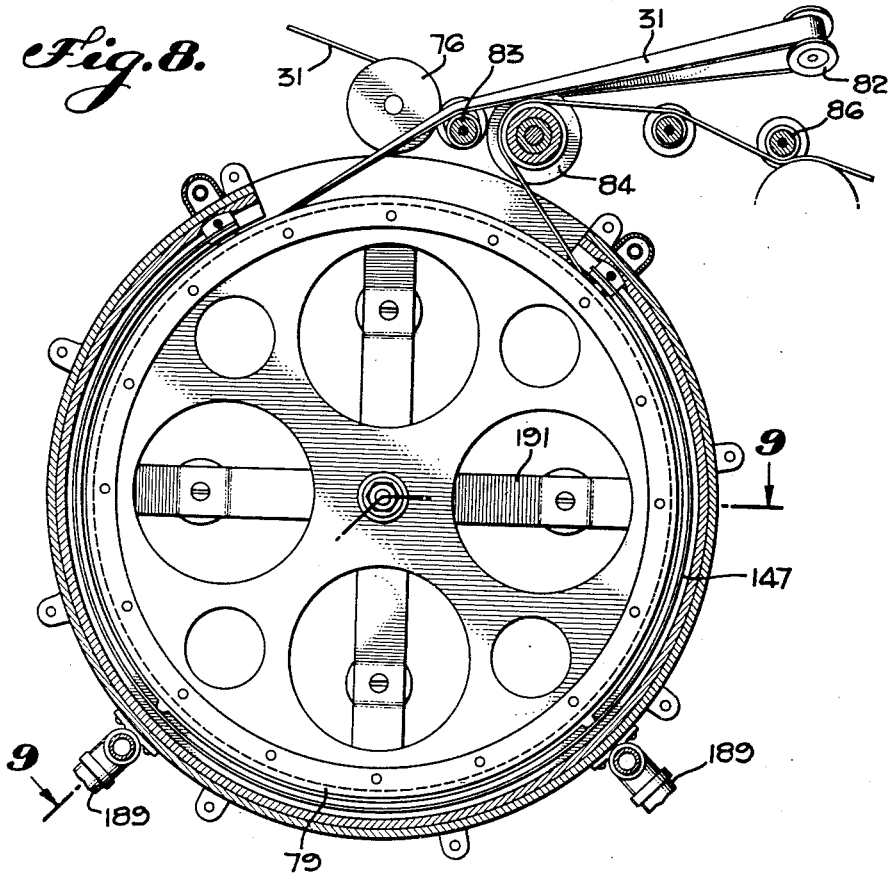
Fig. 8 is an elevational view of the film dryer taken along the line 8—8 of Fig. 3.
Figure 9:
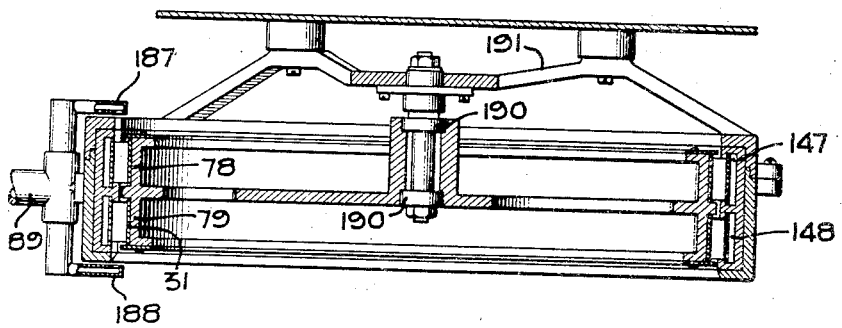
Fig. 9 is a cross-sectional view of the dryer of Fig. 8 taken along the line 9—9 of Fig. 8.

The path of the film as advanced from the magazine 17 to the supply reel 30 will now be described, reference being made particularly to Figs. 1, 2, 3, 4, and 6. The film enters the developing compartment or tank 21 through an opening 42 in the side of the compartment 21, then past a developer spray nozzle 41, over a roller 44, down under a roller 45, to a film sprocket 46, driven by a chain sprocket 47. As shown in Fig. 6, the film passes downwardly and upwardly in a series of loops over free running lower rollers 49 and upper free running rollers 50. The film then passes between two rubber squeegee blades 51, over a roller 52, through an opening between tank 21 and quick wash tank 22, over a roller 54, under a roller 55, between squeegee blades 52, over a roller 53, through a second opening in the tank 22, over a roller 54, and to a film drive sprocket 56. The film then passes downwardly and upwardly over a group of free running rollers 58 and 59, similar to rollers 49 and 50 in compartment 21 (see Fig. 6), then through blades 61 of a squeegee, over roller 62, through an opening between compartments 23 and 24, over a roller 63, and to a film sprocket 64 in the wash tank 24. Again, the film passes in vertical loops between free running rollers 66 and 67 similar to its path in the compartments 21 and 23 (see Fig. 6), and then through air squeegee outlets 69, over roller 70, through an opening between compartments 24 and 25, over a roller 71, under a roller 72, between hot air squeegee outlets 73, over a roller 74, past a hot air outlet 75, to a roller 76. The film then passes around a pair of drying drums 78 and 79, as shown in Figs. 8 and 9, the film first passing around the drum 78, then over a film drive sprocket 81, around angle transfer roller 82, over a guide roller 83, around the drum 79, around roller 84, over a roller 85, under waxing rollers 86, to an over drive sprocket 88 having a pad roller 89 associated therewith. The film then passes around the cooling rollers 27 and 28 to the takeup reel 30. The sprocket 88 is overdriven through a clutch to compensate for shrinkage and contraction of the film 31 during the processing operations.

The film is only positively driven by sprockets 46, 56, 64, 81, and 88, these sprockets being driven by respective chain sprockets 47, 91, 92, 93, and 94, interconnected by a continuous chain 96 from the drive sprocket 97 of a motor 98, which also drives a second chain 99 from a countershaft sprocket 90, which drives sprocket 94 and the takeup reel 30. Thus, the film is driven at these points, while the rollers 49, 58, and 66 are mounted on vertically slideable plates, such as shown at 101, in Fig. 6, so that, as the film contracts and expands during the development thereof, the loops between the respective loop forming rollers in each tank may shorten or lengthen accordingly.

As mentioned above, one of the important features to obtain high quality images as well as the rapid development thereof is due to the particular application of the fluids to the film emulsion and the temperature thereof. This is obtained by the application of the developing fluids by a pressure spray, the fluids heated to approximately 125° F., wherein a large amount of the fluids is rapidly applied directly to the emulsion and the reaction products rapidly removed therefrom. The developer, fixer, and water are applied at a pressure of approximately eight to nine pounds. As shown in Figs. 1 and 6, the developer, hypo, and wash water are applied through a series of spray nozzles, the details of which are shown in Figs. 6 and 7. A spray pipe 105 has branches 106, 107, and 108, to which are attached spray nozzles shown at 109, 110, and 111. A pipe 113 delivers developer to the spray nozzle 41, as shown in Figs. 4 and 5, which applies developer to the film emulsion immediately upon its entrance into the developing compartment 21.

It will be noted that not only is the developer applied to the film by the spray nozzle 41, but it also immediately passes through a small sump tank 114 around roller 45, the developer for the tank 114 being supplied from the spray nozzle 41. The developer exits from the tank 114 through an opening 115 at the bottom of the tank, a baffle plate 116 being provided to prevent the developer from striking the film in the loops between the rollers 49 and 50. A splash baffle plate 117 is provided over the film as it passes to roller 44.

This manner of applying developer is an important feature of the present invention, inasmuch as sufficient developer is applied immediately to the emulsion when it enters the hot developer spray tank 21 to start uniform development thereof, the emulsion then immediately passing into a bath of developer to continue the development before it is sprayed by nozzles 109, 110, and 111. Without this particular entrance developing device, spray and fumes from the main developing nozzles 109, 110, and 111 reach the film before it reaches nozzles 109, and produce spots and streaks on the images which cannot be removed by further development. Thus, by immediately and uniformly providing sufficient developer to the film emulsion as it enters the developing tank, such spots and streaks are eliminated from the images.

The developer from the opening 115 and also from the nozzles 109, 110, and 111 falls to the bottom of compartment 21, as shown at 33, and is then agitated and pumped by pump 120 driven by a motor 121 back to the nozzles again. Thus, the developer is circulated from the bottom of the compartment 21, through the pump, and up through the nozzles 109, 110, and 111 under pressure between eight and nine pounds, which is indicated on a pressure dial 122, the pressure dial being connected through a pipe 123 to the main developer supply line. To maintain the temperature of the developer at approximately 125° F., electrical heaters 158 are provided in the bottom of tank 21 along with a thermostat control 214 and a thermometer control unit 160.

The motor 121 also simultaneously drives another pump 125, which similarly circulates the fixing hypo, as shown at 34, through loop spray nozzles 126, 127, and 128, and an overhead nozzle 129. The fixing fluid is under the same pressure as the developer, and is heated to the same temperature by heaters 159 having a thermostat control 215 and a thermometer control unit 161. Between the developer and hypo tanks 21 and 23, the film passes through a short wash tank 22, where water is supplied to a pair of spray nozzles 131, under approximately eight and one-half pounds pressure and at a temperature of approximately 125° F., for removing the developer from both sides of the film before it passes into the hypo tank 23. This water is supplied from the hot and cold water pipes 133, through a mixing valve 134, and a pressure regulator 135, the water from the tank 22 going through a drain opening and pipe 138 to the discharge outlet pipe 137 connected to the sewer, a fume outlet being shown at 136. (See Fig. 2.) The film, in leaving the developing tank 21, passes between the squeegee blades 51 to remove excess developer, is then washed by spray nozzles 131, and is again squeegeed by squeegee blades 52 before it enters the hypo tank 23. In this manner, substantially all the developer is removed from the film before it enters the hypo tank.

The film in tank 23 travels in the same path as in tank 21, except from back to front, the hypo being agitated and circulated by pump 125 and maintained at approximately 125° F. by the heaters 159. After the film is "fixed" in tank 23, it is squeegeed at 61, then enters the wash tank 24, and loops around rollers 66 and 67 in the same manner as in developer tank 21. The washing is accomplished by spray nozzles, inside nozzles being shown at 140, 141, and 142, and outside nozzles for the back side of the film at 143 and 144. The water for washing the film is obtained in the same manner as for the nozzles 141; that is, through the intake pipes 133, and out through discharge pipe 137. The temperature of this water is controlled by the mixing valve 134 to approximately 125° F., and the pressure thereof is controlled by the pressure regulator 135 to approximately eight and one-half pounds.

As the film leaves the wash tank 24, air from nozzles 69 is applied to both sides of the film to remove the major quantity of the wash water, the film then also passing through a similar pair of nozzles 73, except that the air passing nozzles 73 is heated by a heater 145. (See Fig. 2.) After the film passes around roller 74, it is again subjected to a blast of hot air from nozzle 75, so that as it reaches the first drying drum 78, there is negligible liquid thereon. The film is then subjected to heat as it passes around the two drums 78 and 79, heat being obtained from a pair of electrically heated Nichrome bands 147 and 148, which are on the outside of the film and are thermostatically controlled, and which remain at a desired constant temperature. The power for the heaters is provided by transformers 150 and 151. Compressed air is provided at the desired pressure by compressor 153, driven by a motor 154 by belts 155. An intake silencer is shown at 156, and an outlet silencer is shown at 157. Thus, although the air from drying jets 69, 73, and 75 is under pressure, the noise of compression is reduced to a minimum. To aid in the drying operation, air from jets 187 and 188 is supplied from a pipe 189 to the film, while on wheels 78 and 79. The wheels are film-pulled and rotate on bearing 190, the entire structure being mounted on a spider 191 attached to the frame as shown in Fig. 9.

The action of the main spray nozzles is shown in Fig. 7, wherein alternate nozzles spray in opposite directions to contact the emulsion side of the film, which is within the loops. The nozzle 41 has a plurality of holes therein for adequately covering the emulsion surface of the film 31, while the other nozzles emit thin ribbons of fluid. The film is thus subjected to a continuous rapid supply of fresh developer and the rapid removal thereof through gravity, while the temperature of the developer and hypo is thermostatically controlled by heaters 158 and 159 and thermostats 214 and 215, the temperatures being indicated on meters 163 and 164, respectively, connected to thermometer elements 160 and 161. Meter 165 indicates the pressure of the hypo, and meter 166 indicates the temperature of the washing water, while meter 167 indicates the pressure of this water. The water pressure is controlled by regulator 135 and the temperature of the water is controlled by mixing valve 134.

Another control panel is shown in the lower right-hand corner of Fig. 1 (see also Fig. 10), this panel having a tell-tale light 168 indicating that the main circuit is turned on by a switch 169; tell-tale 170 indicating that the heater breaker is turned on by switch 171; tell-tale 172 indicating that the pump breaker is energized by switch 173; tell-tale 174 indicating that the compressor motor and drive motor breaker are energized by switch 175; and tell-tale 176 indicating that the breaker for the dryer heating elements 147 and 148 is energized by switch 177. The upper portion of the meter panel shows a start switch 180 and a stop switch 181 for the developer and hypo pump motor 121, while a start switch 182 and stop switch 183 are provided for the film drive motor and compressor motor. Tell-tale 184 indicates the energization of the motor for the pumps, and tell-tale 185 indicates the energization of the film drive and compressor motors; tell-tale 186, for the tank heaters; tell-tale 187, for the developer heater; and tell-tale 188, for the hypo heater.

One of the features of the invention which contributes to obtaining a high development speed in a small space is the rapid drying process, wherein a double drum for heating the film is employed. Doubling the drum area by concentrically mounted drums, lengthens the amount of film subjected to the heating operation at one time and within a small over-all space, and permits the film to be safely heated to a high temperature. The system is automatically controlled wherever a constant temperature or pressure is needed. To fully complete the preparation of the film in the event it is to be directly passed through a projector, a standard waxing unit is provided at 191, driven through gears and shafts in housing 192, which waxes the sprocket hole portions of the back side of the film.

Figure 10:
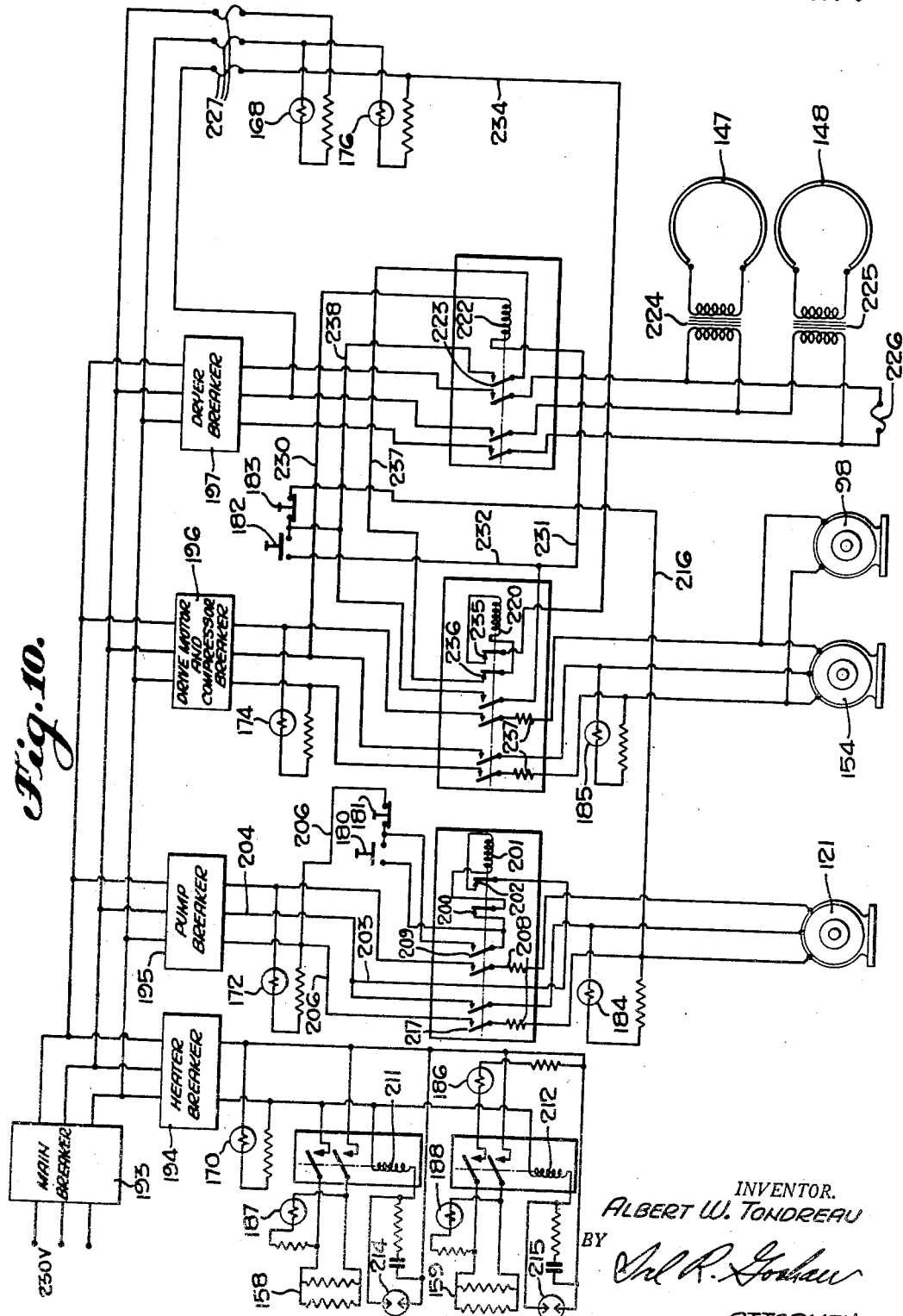
Fig. 10 is a circuit diagram of the electrical controls of the developing machine of the invention.

The general electrical control circuit is shown in Fig. 10, a standard electrical power source of 220, three-phase, energy being supplied through the main circuit breaker 193. The heaters 158 and 159 are connected through heater breaker 194. Also connected to the main breaker is pump motor breaker 195, drive motor and compressor motor breaker 196, and the dryer heating unit breaker 197. The start switch 180 completes a circuit from one power conductor over conductor 206, over stop switch 181, over contact 200, solenoid winding 201, contact 202, conductor 203, to a second main conductor 204. Contacts 200 and 202 remain closed during normal operation, and open on overload conditions by the action of heater elements 208. Once the solenoid 201 is energized, contact 209 locks the circuit over closed stop switch 181 and power is applied to the pump motor 121. Tell-tale 184 is then energized. The relays operated by thermostats 214 and 215 are shown at 211 and 212, respectively, which energize and de-energize respective heaters 158 and 159.

The start and stop drive motor and compressor motor switches 182 and 183 function similarly to the pump starting switches, except that the start switch connection from switch 182 is through stop switch 183 and over conductor 216 and contact 217. Start switch 182 first energizes relay 222 over conductors 230, 231, and 232, switches 182 and 183, and conductor 216, which closes its contacts, contact 223 permitting the energization of relay 220 over conductor 234, contacts 235 and 236, conductor 237, contact 223, conductor 238, switch 183, and conductor 216. Thus, it is necessary for the developer and hypo pumps to be energized and operating before the film advancing mechanism, compressor motor, and heating units 147 and 148 are energized. This is a feature which provides the desired sequence of operations of the air compressor motor 154, film drive motor 98, and heaters 147 and 148. Contacts 235 and 236 normally remain closed, except during overload conditions, when opened by heaters 237. Protecting fuses are shown at 226 and 227.

In Fig. 2, the various pipe connections for the developer, fixer, water, and air are shown, these connections being standard plumbing practice to provide the results described above. For instance, pipes 245 and 254 deliver the rinse water to tank 22, pipe 246 goes to the water pressure indicator 167, pipe 247 delivers the developer to tank 21, and pipes 248 and 249 are air delivering pipes. At 250 is shown a gear reduction box for the film drive motor 98. Hot air delivering pipe from heater 145 is shown at 252, and rinse water discharge pipe is shown at 253, while hypo delivering pipe is shown at 255 with pipe 256 leading to hypo pressure indicator 165.

At the rate of ninety feet per minute, approximately 171 inches of film are in the developer tank 21 for approximately 9.5 seconds; 14 inches of film are in rinse tank 22 for approximately .72 of a second; 171 inches of film are in fixing tank 23 for approximately 9.5 seconds; 171 inches of film are in wash tank 24 for approximately 9.5 seconds; 178 inches of film are in dryer compartment 25 for approximately 9.7 seconds; and 288 inches of film are in the air loops between rollers 27 and 28 for approximately 16 seconds. Although these times are preferred for a ninety-foot per minute speed, other times may be provided, depending upon the immediate use of the film. By applying the developing fluids at the temperatures and in the manner described above, together with the drying method, excellent images are obtained on both negative and positive emulsions at a rapid rate within a small space.

I claim:

A film developing machine for obtaining rapid and uniform developing, fixing, washing, and drying of a film emulsion comprising spraying means for applying developer, fixer, and water in that order at a temperature of approximately 125 degrees F. and a pressure of approximately eight and one-half pounds, means for initially spraying said emulsion, and means for immediately immersing said film emulsion in developer for approximately one second prior to the action of said first mentioned developer spraying means, said first mentioned spraying means applying said developer for approximately nine seconds.

ALBERT W. TONDREAU.

References Cited in the file of this patent

UNITED STATES PATENTS

| Number | Name | Date |
| --- | --- | --- |
| 1,254,300 | Baker | Jan. 22, 1918 |
| 1,410,884 | Brewster | Mar. 28, 1922 |
| 1,411,098 | Horton | Mar. 28, 1922 |
| 1,479,453 | Carleton | Jan. 1, 1924 |
| 1,631,476 | De Moos | June 7, 1927 |
| 1,666,999 | Garbutt et al. | Apr. 24, 1928 |
| 1,728,361 | Pifer | Sept. 17, 1929 |
| 1,907,252 | Debrie | May 2, 1933 |
| 2,194,345 | Winians | Mar. 19, 1940 |
| 2,251,232 | Houston | July 29, 1941 |
| 2,342,000 | Leshing | Feb. 15, 1944 |
| 2,401,185 | Pratt | May 28, 1946 |

FOREIGN PATENTS

| Number | Country | Date |
| --- | --- | --- |
| 557,933 | Germany | Aug. 30, 1932 |
| 443,581 | Great Britain | Mar. 2, 1936 |